(12) United States Patent
Jurik et al.

(10) Patent No.: US 6,439,607 B1
(45) Date of Patent: Aug. 27, 2002

(54) ENERGY ABSORBING SUPPORT SYSTEM FOR A VEHICLE STEERING MECHANISM

(75) Inventors: Mirjana Jurik, Rochester Hills; Peter Escobedo, Jr., Waterford; Thomas Dziegielewski, Rochester Hills, all of MI (US); Scott D Laney, Toledo, OH (US); John M Stoiber, Oregon, MI (US)

(73) Assignees: DaimlerChrysler Corporation, Auburn Hills, MI (US); Applied Technologies, Inc., Toledo, OH (US)

( * ) Notice: Subject to any disclaimer, the term of this patent is extended or adjusted under 35 U.S.C. 154(b) by 0 days.

(21) Appl. No.: 09/693,598

(22) Filed: Oct. 20, 2000

(51) Int. Cl.$^7$ .................................... B62D 1/19
(52) U.S. Cl. .............................. 280/777; 74/492
(58) Field of Search ..................... 280/777; 74/492, 74/493

(56) References Cited

U.S. PATENT DOCUMENTS

| | | | | |
|---|---|---|---|---|
| 4,630,716 A | | 12/1986 | Faust .......................... 188/371 |
| 5,375,881 A | * | 12/1994 | Lewis .......................... 280/777 |
| 5,517,877 A | * | 5/1996 | Hancock ....................... 74/492 |
| 5,560,650 A | * | 10/1996 | Woycik ......................... 280/777 |
| 5,562,307 A | | 10/1996 | Connor ......................... 280/777 |
| 5,595,399 A | | 1/1997 | Fouquet et al. ................ 280/777 |
| 5,605,352 A | * | 2/1997 | Riefe et al. ................... 280/777 |
| 5,609,364 A | | 3/1997 | Fouquet et al. ................ 280/777 |
| 5,669,633 A | * | 9/1997 | Naff et al. .................... 280/777 |
| 5,720,496 A | | 2/1998 | Riefe et al. ................... 280/775 |
| 5,738,377 A | * | 4/1998 | Sugiki et al. .................. 280/777 |
| 5,788,278 A | * | 8/1998 | Thomas et al. ................. 280/777 |
| 5,802,926 A | * | 9/1998 | Thomas ......................... 74/493 |
| 5,803,496 A | * | 9/1998 | Cymbal ......................... 280/777 |
| 6,170,873 B1 | * | 1/2001 | Jurik et al. ................... 280/777 |

* cited by examiner

Primary Examiner—Paul N. Dickson
Assistant Examiner—L. Lum
(74) Attorney, Agent, or Firm—Ralph E. Smith

(57) ABSTRACT

A vehicle steering mechanism can be supported for controlled collapse in crash situations, by constructing the support mechanism as a rigid assembly having a metal die casting as a principal component. The rigid die casting transmits a shock force from the vehicle steering wheel to shearable fasteners that connect the die casting to a mounting structure on the vehicle. Undesired resilience or spring in the steering shaft support mechanism is eliminated, such that the system has a desired predictability in frontal crash situations.

9 Claims, 3 Drawing Sheets

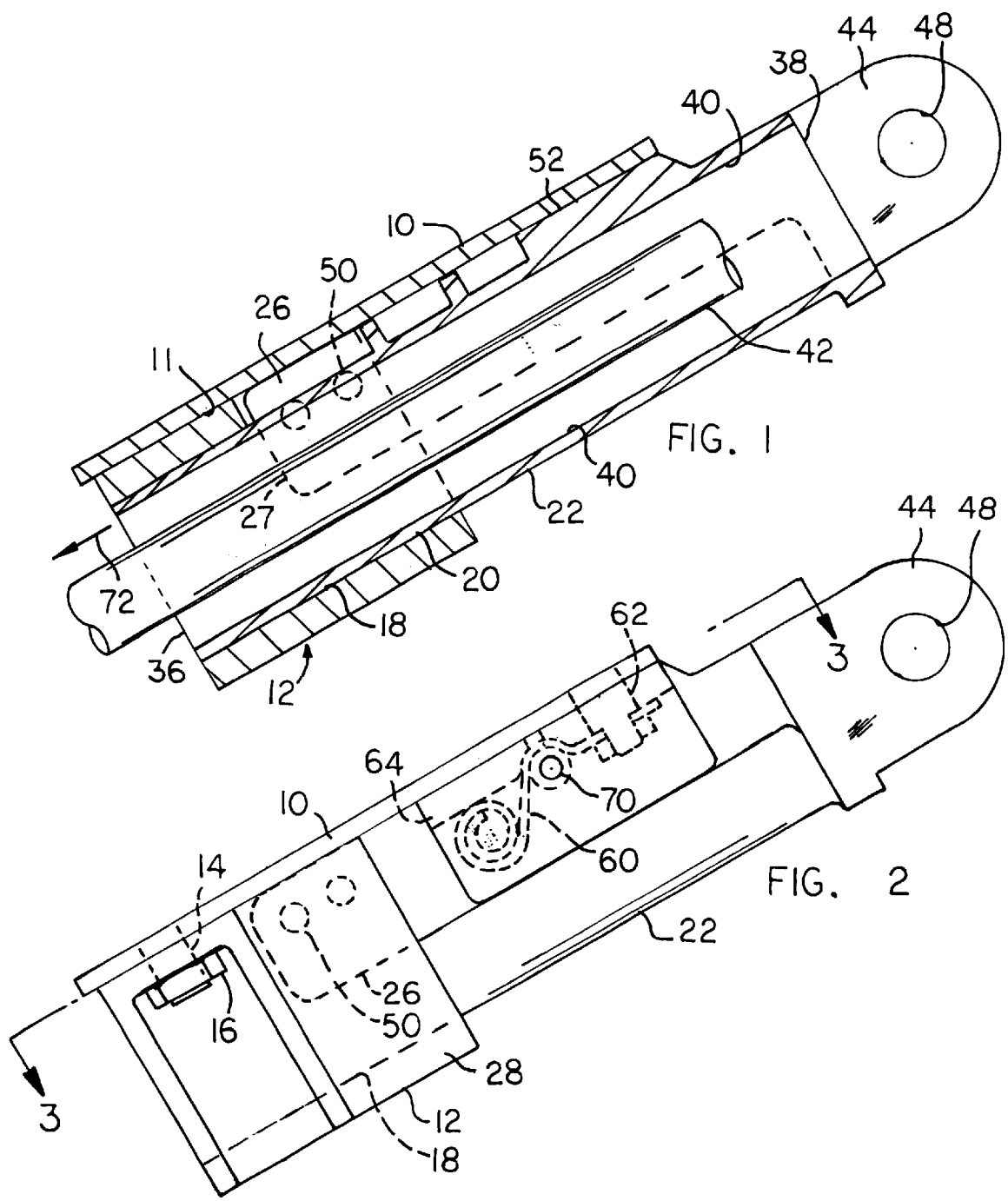

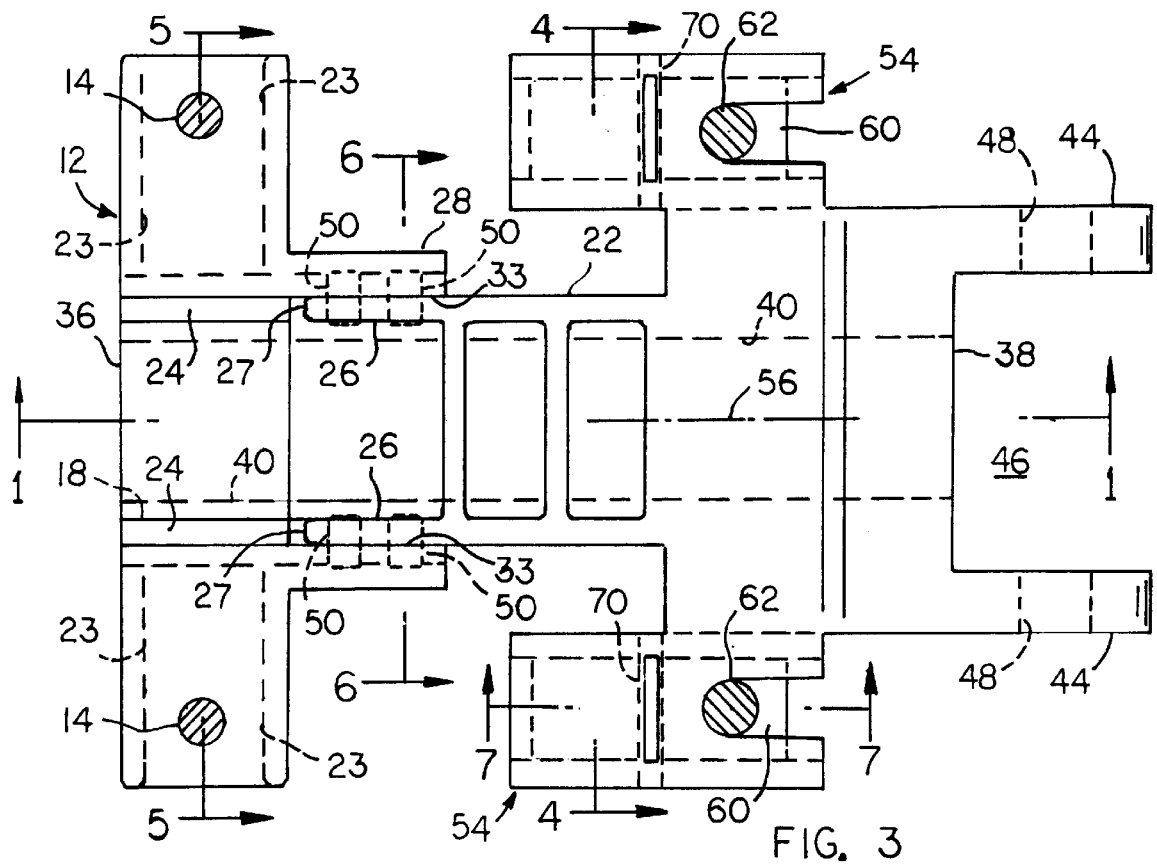
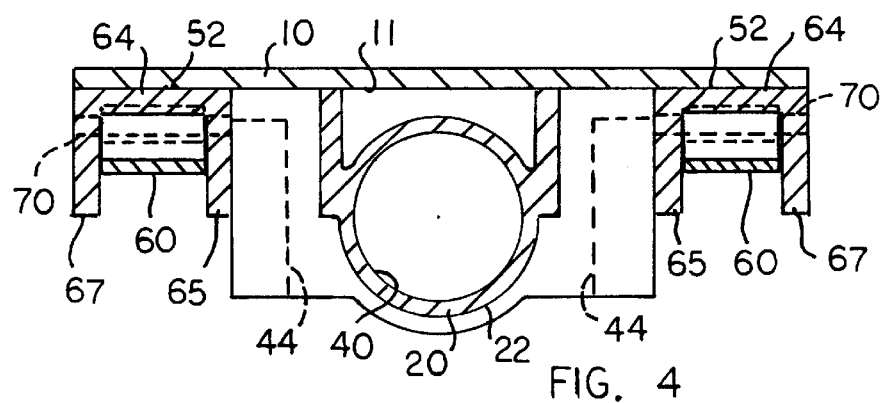

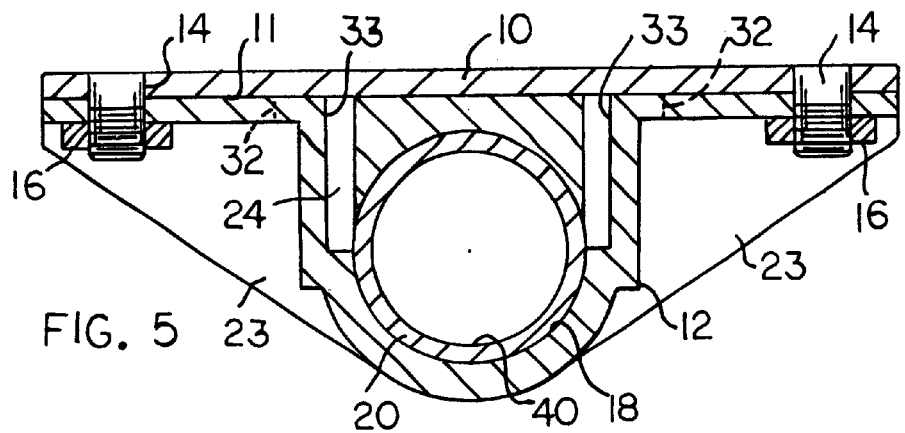
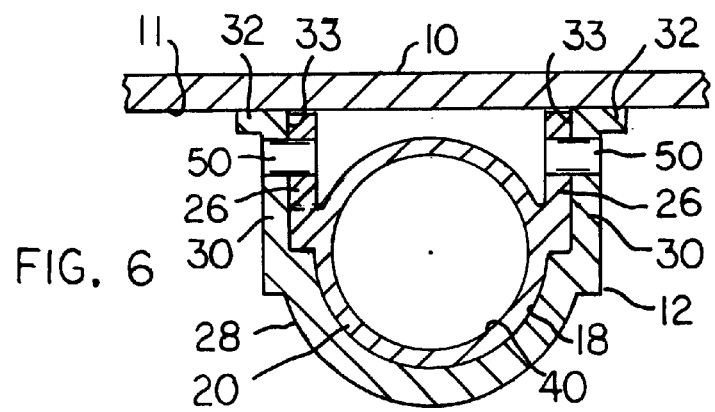
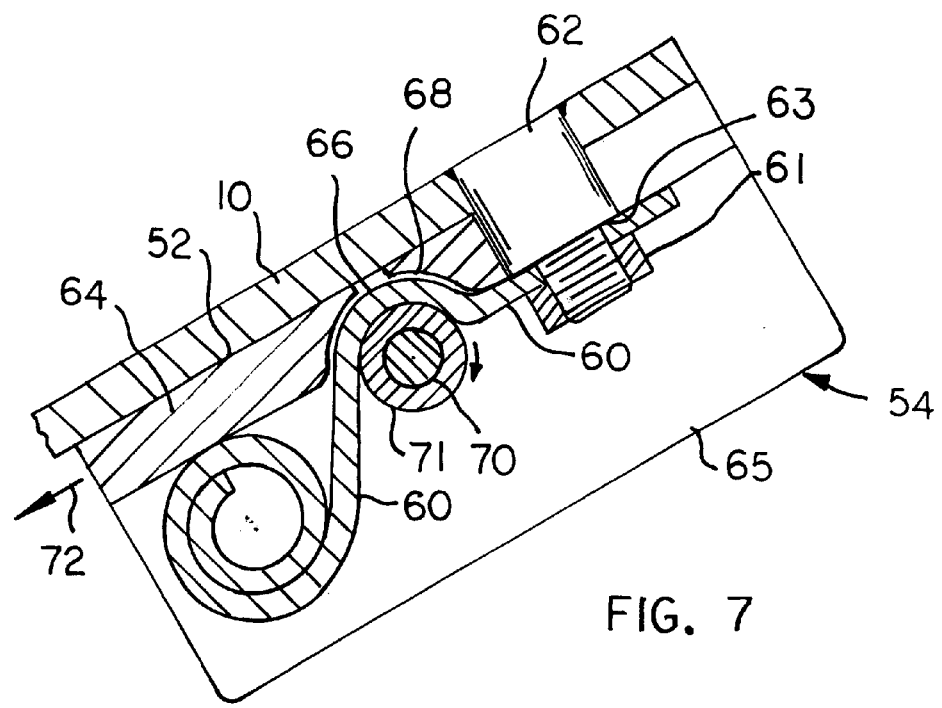

ENERGY ABSORBING SUPPORT SYSTEM FOR A VEHICLE STEERING MECHANISM

FIELD OF THE INVENTION

This invention relates to an energy absorbing support system for a vehicle steering mechanism that includes a steering wheel and a rotary steering shaft extending from the steering wheel.

BACKGROUND OF THE INVENTION

Mechanisms have been devised for allowing vehicle steering wheels to collapse in the event that the driver of the vehicle should forcibly impact the steering wheel during a vehicle crash incident e.g. a front end collision. Such mechanisms are conventionally formed out of stamped metal components suitably welded, or otherwise connected together, to form a deformable support system for the steering shaft and steering wheel.

One problem with such conventional mechanisms is that the stamped components can deflect, or deform, under normal operating loads. In a crash situation the mechanisms can act as a stiff spring so as to delay or prevent collapse of the steering wheel, with the possibility of a momentary oscillating condition tending to prolong human injury. Conventional collapse systems are somewhat unpredictable in crash situations.

SUMMARY OF THE INVENTION

The present invention relates to an energy-absorbing support system for a vehicle steering mechanism, wherein a principal component of the mechanism is formed as a one-piece rigid metal die casting. This rigid metal die casting acts as a support for the vehicle steering shaft and vehicle steering wheel during normal vehicle operations. In a crash situation, the collapse mechanism shears at a predictable shock loading, with minimal time delay in the collapse action.

The rigid die casting has a releasable attachment to an overhead mounting member, via plural shearable fastening devices. Also, the rigid metal die casting has energy-absorbing devices connected to the overhead mounting member, whereby the velocity of the steering system is controlled during the collapsing motion.

Further features of the invention will become apparent from the attached drawing and description of an illustrative embodiment of the invention.

BRIEF DESCRIPTION OF THE DRAWINGS

FIG. 1 is a longitudinal sectional view taken on line 1—1 in FIG. 3, illustrating an illustrative embodiment of the inventor.

FIG. 2 is a side elevational view of the FIG. 1 construction.

FIG. 3 is a view taken on line 3—3 in FIG. 2.

FIG. 4 is a transverse sectional view taken on line 4—4 in FIG. 3.

FIG. 5 is a transverse sectional view taken on line 5—5 in FIG. 3.

FIG. 6 is a transverse sectional view taken on line 6—6 in FIG. 3.

FIG. 7 is an enlarged fragmentary sectional view take on line 7—7 in FIG. 3.

DESCRIPTION OF A PREFERRED EMBODIMENT OF THE INVENTION

Referring to FIGS. 1 through 3, there is shown an energy-absorbing support system for a vehicle steering mechanism, constructed according to the present invention. The support system includes an overhead mounting plate 10 suitably secured to the vehicle beneath the instrument-panel on the driver side of the vehicle. A rigid one-piece bracket 12 is secured to the lower surface 11 of mounting plate 10 by two studs 14. A nut 16 is threaded onto each stud to securely fasten the bracket to the mounting plate. Preferably, bracket 12 is a one-piece metal casting, whereby the bracket has a desired rigidity. The bracket remains attached to mounting plate 10 during a crash situation involving forward motion of the vehicle steering mechanism in the arrow 72 direction, Bracket 12 has a circular hole 18 therethrough that forms a guide surface for tubular section 20 of a shaft housing 22 that forms a principal component of the energy-absorbing support system. Additionally, bracket 12 has two parallel slots 24 communicating with side surfaces of circular hole 18, as best shown in FIG. 5. During a crash situation each slot forms a clearance space for accommodating movement of a fin 26 formed on shaft housing 22. During normal vehicle operations each fin 26 has its leading edge 27 located to the right of the associated slot 24. In a frontal crash situation, shaft housing 22 is displaced in a right-to-left direction, so that each fin 26 moves from the FIG. 3 position into the associated slot 24.

In order to rigidify bracket 12, the bracket can be formed with two integral flanges 21. Each flange has the profile depicted in FIG. 5. The bracket has the transverse cross sectional configuration depicted in FIG. 5 and 6. Slot 24 terminates generally in the plane of the right most flange 23, as shown in FIG. 3. Bracket 12 continues rightwardly beyond the rightmost flange 23, as at 28 in FIG. 3, to form an elongated support surface for tubular section 20 of shaft housing 22. FIG. 1 depicts the length of the support surface 18 for tubular section 20 of the shaft housing.

Section 23 of bracket 12 includes two parallel upstanding struts 30 having rigidifying flanges 32 abutting the undersurface 11 of the mounting plate 10. Each strut 30 has a flat inner surface 33 that forms a continuation of the outer surface of the associated slot 24, Each flat surface 33 forms a support surface for an associated fin 26 on shaft housing 22.

Shaft housing 22 is a rigid one-piece die-casting, preferably formed of magnesium for a desired combination of lightness and strength. Some surfaces of the die-casting can be machined to promote a smooth sliding action of the shaft housing relative to bracket 12 and mounting plate 10 during a frontal crash event. During normal vehicle operations, shaft housing 22 is immovable.

Shaft housing 22 includes a tubular section 20 extending from its left end 36 to its right end 38 (FIG. 3), said tubular section forming a through bore 40 adapted to accommodate a vehicle steering shaft. The steering shaft is fragmentarily shown at 42 in FIG. 1.

At its right (upper) end 38, the shaft housing is formed with two parallel ears 44, spaced apart by a distance greater than the diameter of bore 40, to form an enlarged space 46 between the two ears. Ears 44 have aligned holes 48 therein designed to receive pivot pins that hingedly connect the shaft housing to the vehicle steering wheel, not shown. Space 46 accommodates a universal joint connecting the rotary shaft of the steering wheel to steering shaft 42.

In a frontal crash situation ears 44 transmit a shock force from the steering wheel directly to shaft housing 22. The integral nature of ears 44 on the shaft housing eliminates any undesired spring effect between the steering wheel and the shaft housing.

Shaft housing 22 is connected to support bracket 12 by four transverse shearable fastener pins 50. Each fastener pin has a press fit in aligned circular openings formed in a fin 26 and an associated strut 30. During a frontal crash situation of sufficient magnitude, the four fastener pins 50 shear along the planes of strut surfaces 33, to enable the shaft housing 22 to move in a right-to-left direction. Fins 26 move into slots 24, while bracket 12 remains firmly attached to mounting plate 10. Hole surface 18 of bracket 12 acts as a guide surface for tubular section 20 of the shaft housing.

Preferably, at least four fastener shear pins 50 are used to connect the shaft housing to bracket 12. By using at least four shear pins the effect of a tolerance variation on the shear strength of any one fastener pin is minimized. A tolerance in the plus direction for one pin can be statistically balanced by a tolerance in the negative direction for another pin.

The upper surface of shaft housing 22 is preferably flat, as shown at 52 in FIGS. 1 and 4, whereby the shaft housing receives slidable guidance from mounting plate 10 during right-to-left movement of the shaft housing.

In order to control the velocity of the shaft housing during a crash situation there is provided at least one energy-absorbing mechanism 54 located between shaft housing 22 and mounting plate 10. In the illustrated construction, two similarly constructed energy absorbers are used. As shown in FIG. 3, the two energy-absorbing mechanisms are located outboard equidistantly from longitudinal axis 56 of the shaft housing. The construction of each energy absorber is best seen in FIGS. 2, 4 and 7.

A representative energy absorbing mechanism includes a strip of bendable material 60 having a circular hole that receives a stud 62 extending downwardly from mounting plate 10. A nut 61 is threaded onto the stud to clamp the bendable strip to a shoulder 63 formed on the stud. The bendable strip is thereby anchored to plate 10, via the stud and nut assembly. The free end of strip 60 is coiled to achieve a desired compactness.

Shaft housing 22 has an integral flat wall 64 that is interposed between mounting plate 10 and bendable strip 60, with a slight clearance therebetween. As shown in FIG. 7, strip 60 has a preformed semi-circular crimped area 66 that conforms to the surface of a semi-circular recess 68 in the lower face of wall 64. A transverse circular pin 70 is mounted on the shaft housing below wall 64, to define a crimp-forming mechanism. As shown in FIG. 4, the pin 70 extends through aligned openings in flange walls 65 and 67 of the shaft housing, whereby the pin is rigidly secured to the housing. In the illustrated arrangement, pin 70 is equipped with a rotary sleeve 71; however the sleeve is optional, as a pin having an appropriate diameter could be used as a crimp former. Recess 68 is concentric around the pin 70 axis.

During high speed motion of the shaft housing 22, wall 64 moves in the arrow 72 direction (FIG. 7). Bendable strip 60 remains anchored to mounting plate 10 (via anchoring studs 62), while the crimp-former 71 moves with wall 64. As a result, successive areas of strip 60 move rightwardly relative to the surface of sleeve 71, so as to undergo a crimping action.

The crimping action on bendable strip 60 absorbs a part of the energy associated with the movement of wall 64. As a result, the velocity of shaft housing 22 is slowed or controlled. The shaft housing velocity is effectively snubbed, without any undesired rebound of the steering wheel toward the driver of the vehicle.

The energy-absorber 54 depicted in FIG. 7 is directly mounted between shaft housing 22 and mounting wall 10, so that the snubbing action has maximum effectiveness. During movement of the shaft housing in the arrow 72 direction, the upper surface of each bendable strip 60 acts as a guide surface for the associated wall 64, so that shaft housing 22 is adequately guided by the conjoint action of bracket hole surface 18 and the upper surfaces of strip 60.

A principal feature of the invention is that the shaft housing 22 is a one piece die casting formed of a relatively strong, light weight material, such as magnesium. The shaft housing includes tubular section 20, fins 26, ears 44, walls 64, and flange walls 65 and 67. Cavities can be formed at some areas of the die casting to reduce its weight without appreciably reducing its strength in the longitudinal direction. The rigid die casting eliminates any springiness that might otherwise exist in the force-transmitting connection between ears 44 and the shearable fasteners 50. As a result, shaft housing 22 has an immediate predictable response in a crash situation.

While the drawings necessarily show a specific construction embodying the invention, it will be appreciated that some structural variations can be employed while still practicing the invention.

What is claimed:

1. An energy-absorbing support system for a vehicle steering mechanism, comprising:

an overhead mounting member having a lower surface;

a rigid one-piece shaft housing slidably engaging said lower surface; said one-piece housing having a lower end and an upper end, two spaced ears at said upper end, and a through bore extending between said upper end and said lower end, whereby said ears are adapted to hingedly support a vehicle steering wheel, and said bore is adapted to accommodate a steering shaft extending downwardly from the steering wheel;

a shaft housing support bracket secured to the lower surface of said overhead mounting member; said bracket having an internal guide surface slidably encircling the lower end of said shaft housing;

shearable fasteners interconnecting said support bracket and said shaft housing for normally holding the housing in a fixed position relative to the bracket; and an energy-absorbing means positioned to control movement of the shaft housing after said fasteners have been sheared, wherein said energy-absorbing means comprises a strip of bendable material anchored to said mounting member, and a crimp-former carried by said shaft housing, wherein said crimp-former comprises a wall having a semi-circular recess and a circular pin located within said recess; said strip of bendable material extending through a space between said pin and said semi-circular recess, so that during movement of said shaft housing successive areas of the strip move through said space.

2. The energy-absorbing support system of claim 1, wherein said one-piece shaft housing is a metal casting.

3. The energy-absorbing support systems of claim 1, wherein said one-piece shaft housing is a metal die casting.

4. The energy-absorbing support system of claim 1, wherein said one-piece shaft is a magnesium die casting.

5. The energy-absorbing support system of claims 1, wherein said shearable fasteners comprise four separate fastener pins extending transverse to the axis of the through bore.

6. The energy-absorbing support system of claim 1, wherein said shaft housing has two parallel fins extending parallel to the axis of said through bore; said support bracket having two parallel struts extending alongside said fins; said shearable fasteners comprising two separate fastener pins extending through each fin into an associated strut.

7. The energy-absorbing support system of claim 1, wherein said ears are spaced apart by a distance that is greater than the diameter of said bore, to form an area for accommodating a universal joint on the steering shaft.

8. The energy-absorbing support system of claim 1, wherein said strip of bendable material extends through an accurate space defined by the pin, so that during high velocity movement of said shaft housing successive areas of the strip effectively move across the pin surface to undergo a crimping action.

9. The energy-absorbing support system of claim 1, wherein said support bracket is a one-piece metal casting.

* * * * *